United States Patent
Wang

(10) Patent No.: US 10,557,983 B2
(45) Date of Patent: Feb. 11, 2020

(54) LIGHT GUIDE PLATE, MANUFACTURING METHOD THEREOF, BACKLIGHT MODULE AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventor: Xuerong Wang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/077,554

(22) PCT Filed: Dec. 7, 2017

(86) PCT No.: PCT/CN2017/114891
§ 371 (c)(1),
(2) Date: Aug. 13, 2018

(87) PCT Pub. No.: WO2018/126835
PCT Pub. Date: Jul. 12, 2018

(65) Prior Publication Data
US 2019/0033509 A1    Jan. 31, 2019

(30) Foreign Application Priority Data
Jan. 9, 2017 (CN) .......................... 2017 1 0013907

(51) Int. Cl.
*G02B 6/00* (2006.01)
*F21V 8/00* (2006.01)

(52) U.S. Cl.
CPC .......... *G02B 6/0038* (2013.01); *G02B 6/0043* (2013.01); *G02B 6/0055* (2013.01); *G02B 6/0065* (2013.01)

(58) Field of Classification Search
CPC .......... G02B 6/0031; G02B 6/35; G02B 6/38; G02B 6/43; G02B 6/55; G02B 6/65
See application file for complete search history.

(56) References Cited

U.S. PATENT DOCUMENTS

2012/0262940 A1* 10/2012 Miyairi ................ G02B 6/0038
                                                                 362/602
2015/0260899 A1    9/2015 Cheol et al.
(Continued)

FOREIGN PATENT DOCUMENTS

CN    101561116 A    10/2009
CN    103913796 A     7/2014
(Continued)

OTHER PUBLICATIONS

Search Report and Written Opinion for International Application No. PCT/CN2017/114891 dated Feb. 26, 2018.
(Continued)

*Primary Examiner* — Anne M Hines
(74) *Attorney, Agent, or Firm* — Calfee, Halter & Griswold LLP

(57) ABSTRACT

A light guide plate, a method of manufacturing a light guide plate, a backlight module, and a display device are disclosed. A reflective layer is provided within the light guide plate, and the reflective layer is located in the path of the parallel incident light for reflecting the parallel incident light so that the parallel incident light exits from the light exit surface. The parallel incident light is an incident light parallel to the light exit surface. Without the a reflective layer, the parallel incident light propagates linearly within the light guide plate and exits from the opposite surface of the light entrance
(Continued)

surface. The reflective layer changes the original linear path of the reflective layer and makes the parallel incident light continue to propagate in other directions within the light guide plate.

13 Claims, 3 Drawing Sheets

(56) References Cited

U.S. PATENT DOCUMENTS

2016/0299279 A1 10/2016 Uehara et al.
2018/0003883 A1 1/2018 Zhu
2019/0033509 A1 1/2019 Wang

FOREIGN PATENT DOCUMENTS

| CN | 105911637 A | 8/2016 |
| CN | 106054445 A | 10/2016 |
| CN | 106772773 A | 5/2017 |
| CN | 107300806 A | 10/2017 |
| JP | 2006012722 A | 1/2006 |

OTHER PUBLICATIONS

First Office Action for Chinese Patent Application No. 2017100139075 dated Oct. 26, 2018.

* cited by examiner

RELATED ART

LIGHT GUIDE PLATE, MANUFACTURING METHOD THEREOF, BACKLIGHT MODULE AND DISPLAY DEVICE

RELATED APPLICATIONS

The present application is the U.S. national phase entry of the international application PCT/CN2017/114891, with an international filing date of Dec. 7, 2017, which claims the benefit of Chinese Patent Application No. 201710013907.5, filed on Jan. 9, 2017, the entire disclosures of which are incorporated herein by reference.

TECHNICAL FIELD

The present disclosure relates to the field of display technology, in particular to a light guide plate, a manufacturing method thereof, a backlight module and a display device.

BACKGROUND

The backlight module provides a light source for a display device such as a liquid crystal display (LCD). The LCD itself does not emit light, and the light guide plate (LGP) is an important part of the backlight module. The function of the light guide plate is to convert a line light source into a surface light source.

Referring to FIG. 1, a schematic cross section view of a light guide plate in a related art is shown. The light guide plate 10 includes: a light entrance surface 101 for receiving light emitted by the LED light source 20, a light exit surface 102 connected with the light entrance surface 101, and a bottom surface 103 connected with the light entrance surface 101 and opposite to the light exit surface 102. The bottom surface 103 is provided with dots 1031 for scattering light. The light emitted by the LED light source 20 enters the light guide plate 10 from the light entrance surface 101. The light is totally reflected and propagates in the light guide plate 10. When the light propagates to the bottom surface 103, it is scattered by the dots 1031 and finally exits from the light exit surface 102.

SUMMARY

A first exemplary embodiment of the present disclosure provides a light guide plate. The light guide plate includes a light entrance surface, a light exit surface connected with the light entrance surface, and a bottom surface connected with the light entrance surface and opposite to the light exit surface. A reflective layer is provided within the light guide plate, and the reflective layer is located in a path of a parallel incident light for reflecting the parallel incident light so that the parallel incident light exits from the light exit surface. The parallel incident light is an incident light parallel to the light exit surface.

In the context of the present disclosure, the "parallel incident light" refers to a light beam that enters the light guide plate in a direction parallel to the light exit surface.

In some exemplary embodiments, the light exit surface is provided with a groove, a direction of the groove is parallel to the light entrance surface, and the reflective layer is disposed on a groove surface of the groove.

In some exemplary embodiments, the groove is filled with UV adhesive; a refractive index of the UV adhesive is substantially the same as that of a material of the light guide plate.

In some exemplary embodiments, the reflective layer is located close to the light entrance surface.

In some exemplary embodiments, a material of the reflective layer includes silver, aluminum, zinc sulfide, or a combination of any two thereof.

A second exemplary embodiment of the present disclosure provides a backlight module, which includes the light guide plate as described in any one of the above embodiments.

A third exemplary embodiment of the present disclosure provides a display device, which includes the backlight module as described in the above embodiment. For example, the display device can be a liquid crystal display device, and the liquid crystal display device includes the backlight module described in the above embodiment and a liquid crystal panel disposed at the light exit side of the backlight module.

A fourth exemplary embodiment of the present disclosure provides a method for manufacturing a light guide plate. The method includes: manufacturing a light guide plate, the light guide plate including a light entrance surface, a light exit surface connected with the light entrance surface, and a bottom surface connected with the light entrance surface and opposite to the light exit surface; forming a reflective layer within the light guide plate, the reflective layer being located in a path of a parallel incident light for reflecting the parallel incident light so that the parallel incident light exits from the light exit surface. The parallel incident light is an incident light parallel to the light exit surface.

In some embodiments, the step of manufacturing the light guide plate includes: forming a light guide plate with a groove at the light exit surface by an injection molding process, the position of the groove being close to the light entrance surface and a direction of the groove being parallel to the light entrance surface; hardening the groove and forming a reflective layer on a groove surface of the groove by a sputtering process.

In certain exemplary embodiments, a material of the reflective layer is silver, aluminum, zinc sulfide or a combination of any two thereof.

In certain exemplary embodiments, the step of manufacturing the light guide plate further includes: filling the groove with UV adhesive. A refractive index of the UV adhesive is substantially the same as that of a material of the light guide plate.

In some embodiments, the material of the light guide plate is polymethyl methacrylate.

BRIEF DESCRIPTION OF THE DRAWINGS

In order to more clearly illustrate the technical solutions in embodiments of the disclosure or in the prior art, the appended drawings needed to be used in the description of the embodiments or the prior art will be introduced briefly in the following. Obviously, the drawings in the following description are only some embodiments of the disclosure, and for those of ordinary skills in the art, other drawings may be obtained according to these drawings under the premise of not paying out creative work.

DETAILED DESCRIPTION OF THE DISCLOSURE

To make the objects, technical solutions, and advantages of the present disclosure clearer and more comprehensible, the following describes the embodiments of the present disclosure in detail in combination with specific embodiments and with reference to the drawings.

It has been realized that a general LED light source has a light emission angle of about 120°, and a central portion emits incident light parallel to the light exit surface 102, which accounts for 30% of the total light output of the LED light source 20. Since the conventional light guide plate 10 has a flat plate shape, the incident light parallel to the light exit surface 102 emitted by the LED light source 20 exits directly after being propagated linearly in the light guide plate 10. That is, this part of light does not exit from the light exit surface 102, so that this part of light is lost, limiting the brightness of the backlight module and the display device.

To this end, the object of the present disclosure is to provide a light guide plate, a manufacturing method thereof, a backlight module and a display device, so as to significantly increase the brightness of the backlight module.

Embodiment 1

Figure 1:
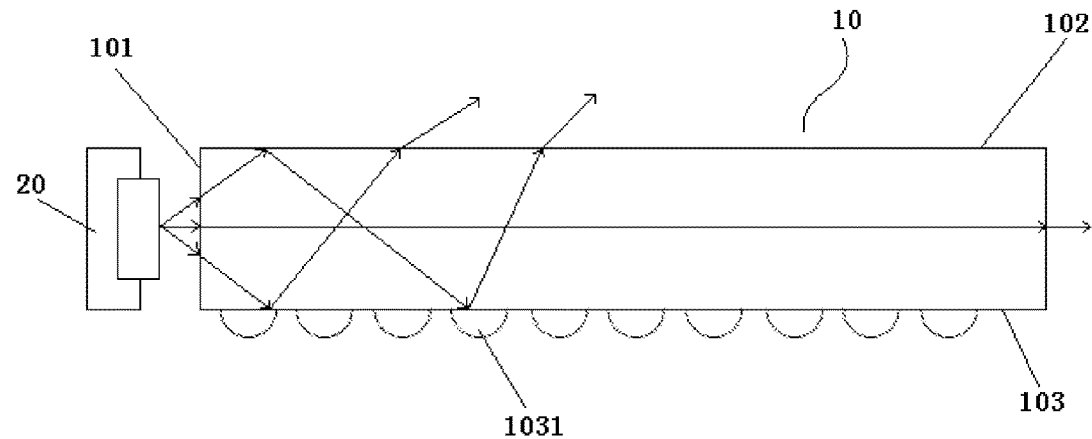
FIG. 1 is a schematic cross section view of a light guide plate in the related art.
Figure 2:
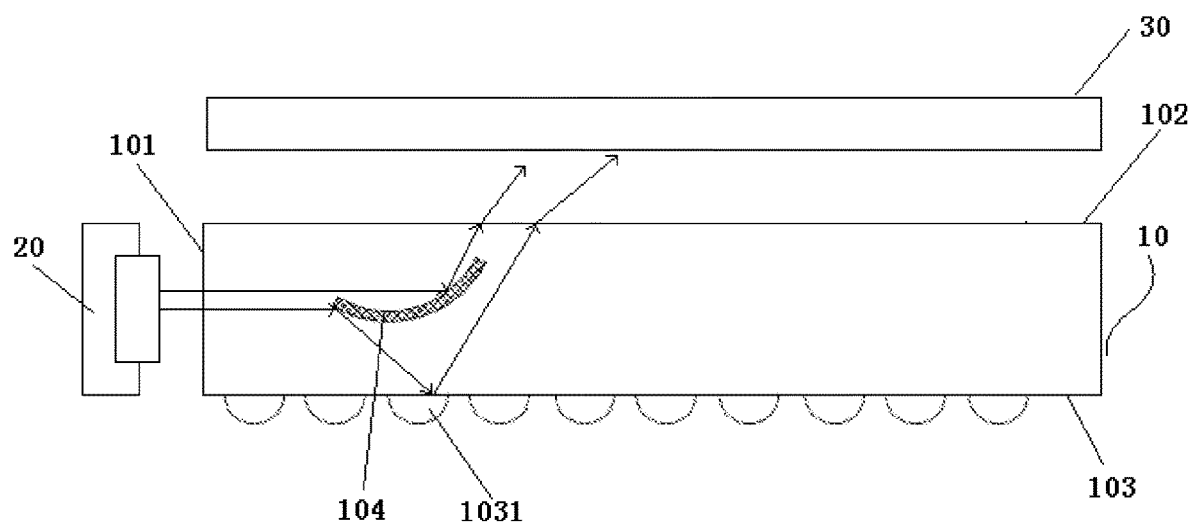
FIG. 2 is a schematic cross section view of a light guide plate according to a first embodiment of the present disclosure.

A first embodiment of the present disclosure provides a light guide plate. Referring to FIG. 2, the light guide plate 10 includes: a light entrance surface 101 for receiving light emitted by an LED light source 20, a light exit surface 102 connected with the light entrance surface 101, and a bottom surface 103 connected with the light entrance surface 101 and opposite to the light exit surface 102. The bottom surface 103 is provided with dots 1031 for scattering light. A reflective layer 104 is further provided within the light guide plate 10, and the reflective layer 104 is located in the path of the parallel incident light emitted by the LED light source 20. The parallel incident light refers to a light beam that enters the light guide plate in a direction parallel to the light exit surface 102. According to the light emitting characteristics of the commonly used LED light source 20, the parallel incident light is concentrated in the central position of the light exit surface of the LED light source 20.

Since the reflective layer 104 is disposed accordant with the central position of the light exit surface of the LED light source 20 (i.e., the reflective layer 104 is in the path of the parallel incident light), the linearly propagated parallel incident light reaches the reflective layer 104 and the original linear path is changed. The light is propagated in other directions within the light plate 10. When the light is propagated to the bottom surface 103, it is scattered by the dots 1031 and finally exits from the light exit surface 102.

In this embodiment, a reflective layer is provided within the light guide plate in the path of the parallel incident light. Without the reflective layer, the parallel incident light propagates linearly within the light guide plate and exits from the opposite surface of the light entrance surface. The reflective layer changes the original linear path of the reflective layer and makes the parallel incident light continue to propagate in other directions within the light guide plate. The parallel incident light is finally scattered by the dots on the bottom surface and then exits from the light exit surface, and the parallel incident light lost in the prior art is reused, so that the brightness of the backlight module with the above light guide plate is significantly increased, and the display device provided with the above light guide plate has a better display effect.

In certain exemplary embodiments the reflective layer can be a reflective layer of a metal material formed on the groove surface of the groove located at the light exit surface of the light guide plate by a sputtering process. The reflective layer can also be a reflective layer of metal material dots or reflective resin material dots directly formed in the light guide plate by a dot printing process. The reflective layer can also be a reflective layer of reflective resin material formed in the light guide plate by a single injection molding process. Further, the shape of the reflective layer can be arched (as shown in FIG. 2), planar, folded, spherical, or be other regular or irregular solid structure shape. The implementation of the reflective layer can be flexibly selected from the above methods or other feasible methods according to the actual application requirements, as long as the reflective layer is located in the path of the parallel incident light and can change the original linear path of the parallel incident light. These implementations all fall within the scope of the present disclosure.

Embodiment 2

Figure 3:
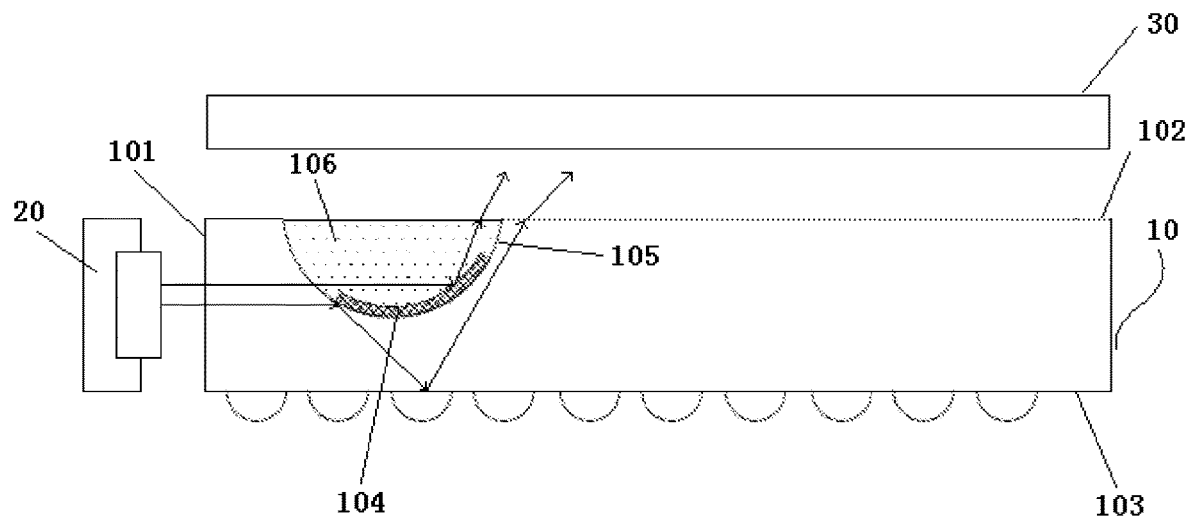
FIG. 3 is a schematic cross section view of a light guide plate according to a second embodiment of the present disclosure.

As a specific embodiment, a second embodiment of the present disclosure provides a light guide plate. Referring to FIG. 3, the light exit surface 102 of the light guide plate 10 is provided with a groove 105. In certain exemplary embodiments, the groove 105 is configured to be a cylindrical groove (i.e. the cross section is an arc) close to the light entrance surface 101, and the direction of the groove is parallel to the light entrance surface 101; the bottom of the groove 105 is accordant with or slightly lower than (slightly closer to the bottom surface 103) the central position (corresponding to the area emitting the parallel incident light) of the light exit surface of the LED light source 20.

The reflective layer 104 is disposed on the groove surface of the groove 105 by a sputtering process, and is specifically disposed at the bottom groove surface of the groove 105. Based on the shape of the cylindrical groove, a reflective layer 104 with an arched surface is formed; and based on the position of the groove 105, the reflective layer 104 is accordant with the central position of the light exit surface of the LED light source 20, that is, the reflective layer 104 is in the path of the parallel incident light. A material of the reflective layer 104 can include silver, aluminum, zinc sulfide, or a combination of any two thereof. Of course, other metal materials can also be selected as long as the reflective function can be realized. Since silver or aluminum has better reflective performance, the material of the reflective layer 104 can be silver or aluminum. Since the groove 105 is disposed close to the light entrance surface 101, the parallel incident light can reach the reflective layer 104 first, and the of light intensity loss of the parallel incident light propagating in the light guide plate 10 is reduced. With the above arrangement, the reflective layer is further used to reflect the parallel incident light toward the light exit surface or the bottom surface.

The groove 105 is filled with UV adhesive 106, and a refractive index of the selected UV adhesive 106 should be substantially the same as that of a material of the light guide plate 10. Due to the thin thickness of the light guide plate 10, the groove 105 may affect the overall structural strength of the light guide plate 10. Therefore, in this embodiment, the groove 105 is filled with the UV adhesive 106, so that the UV adhesive 106 fills up the groove 105. A hardening treatment is performed for the groove 105 and the UV adhesive 106 correspondingly, so as to increase the overall structural strength of the light guide plate 10. Furthermore, the refractive index of the selected UV adhesive is substantially the same as that of the material of the light guide plate, so as to ensure the uniform propagation of light in the light guide plate.

In this embodiment, a specific implementation of a reflective layer is provided. The reflective layer is formed by sputtering on the groove surface of the groove, and the groove is close to the light entrance surface and parallel to the light entrance surface at the light exit surface. Based on the groove arrangement, the reflective layer is in the path of the parallel incident light. The reflective layer can reflect the parallel incident light to the light exit surface or the bottom surface of the light guide plate, so that the parallel incident light exits directly from the light exit surface, or reaches the bottom surface after being reflected once and then is scattered by the dots at the bottom surface, and finally exits from the light exit surface. Thus, the utilization rate of the parallel incident light is further improved, and the light intensity loss of the parallel incident light propagating in the light guide plate is effectively reduced.

The brightness contrast test is performed between light guide plate provided in the second embodiment of the present disclosure and the light guide plate in the prior art under the condition that the same LED light source is used. The optical brightness of the light guide plate of the embodiment of the present disclosure is greatly improved, and no other unfavorable changes occur in the light effect.

In certain exemplary embodiments under the premise of ensuring the overall structural strength of the light guide plate, the depth of the groove can be set to be deeper, that is, the bottom of the groove can be lower than the central position of the light exit surface of the LED light source, and more closer to the bottom surface; the sputtering position of the reflective layer is accordant with the central position of the light exit surface of the LED light source, and the reflective layer is correspondingly sputtered at the corresponding groove surface position between the bottom of the groove and the opening of the groove. In addition, according to a specific application requirement, the cross section shape of the groove may also be other shapes, such as a "V" shape. Accordingly, the shape of the reflective layer is also set as a planar shape or a folded shape according to the cross section shape of the groove. The cross section shape, depth of the groove, and the position of the reflective layer can be flexibly selected from the above methods or other feasible methods according to the actual application requirements, as long as the reflective layer is located in the path of the parallel incident light and can reflect the parallel incident light to the light exit surface or the bottom surface. These implementations all fall within the scope of the present disclosure.

Embodiment 3

A third embodiment of the present disclosure provides a backlight module including the light guide plate provided by any of the above embodiments. As shown in FIG. 2 and FIG. 3, the backlight module includes a light guide plate 10 and an LED light source 20. The LED light source is disposed at the light entrance surface 101 of the light guide plate 10.

In the backlight module provided in this embodiment, the light guide plate of the above embodiments of the present disclosure is used. A reflective layer is provided within the light guide plate in the path of the parallel incident light. Without the reflective layer, the parallel incident light propagates linearly within the light guide plate and exits from the opposite surface of the light entrance surface. The reflective layer changes the original linear path of the reflective layer and makes the parallel incident light continue to propagate in other directions within the light guide plate. The parallel incident light is finally scattered by the dots on the bottom surface and then exits from the light exit surface, and the parallel incident light lost in the prior art is reused, so that the brightness of the backlight module with the above light guide plate is significantly increased, and the display device provided with the above light guide plate has a better display effect.

In certain exemplary embodiments, the backlight module is applied to a liquid crystal television or a liquid crystal display device, and can also be applied to a display device that requires backlight, such as a digital photo frame, an electronic paper, and a mobile phone.

Embodiment 4

A fourth embodiment of the present disclosure provides a display device including the backlight module provided by the third embodiment. For example, the display device may be a liquid crystal display device, and the liquid crystal display device includes the backlight module described in the above embodiments and a liquid crystal panel disposed at the light exit side of the backlight module. As shown in FIG. 2 and FIG. 3, the display device includes a backlight module and a liquid crystal panel 30 disposed at a light exit side of the backlight module.

In the display device provided in this embodiment, the light guide plate of the above embodiments of the present disclosure is used. A reflective layer is provided within the light guide plate in the path of the parallel incident light. Without the reflective layer, the parallel incident light propagates linearly within the light guide plate and exits from the opposite surface of the light entrance surface. The reflective layer changes the original linear path of the reflective layer and makes the parallel incident light continue to propagate in other directions within the light guide plate. The parallel incident light is finally scattered by the dots on the bottom surface and then exits from the light exit surface, and the parallel incident light lost in the prior art is reused, so that the brightness of the backlight module with the above light guide plate is significantly increased, and the display device provided with the above light guide plate has a better display effect.

The display device can be any product or component having a display function such as a liquid crystal panel, an electronic paper, a mobile phone, a tablet computer, a television, a display, a notebook computer, a digital photo frame, a navigator, and the like.

Embodiment 5

Figure 4:
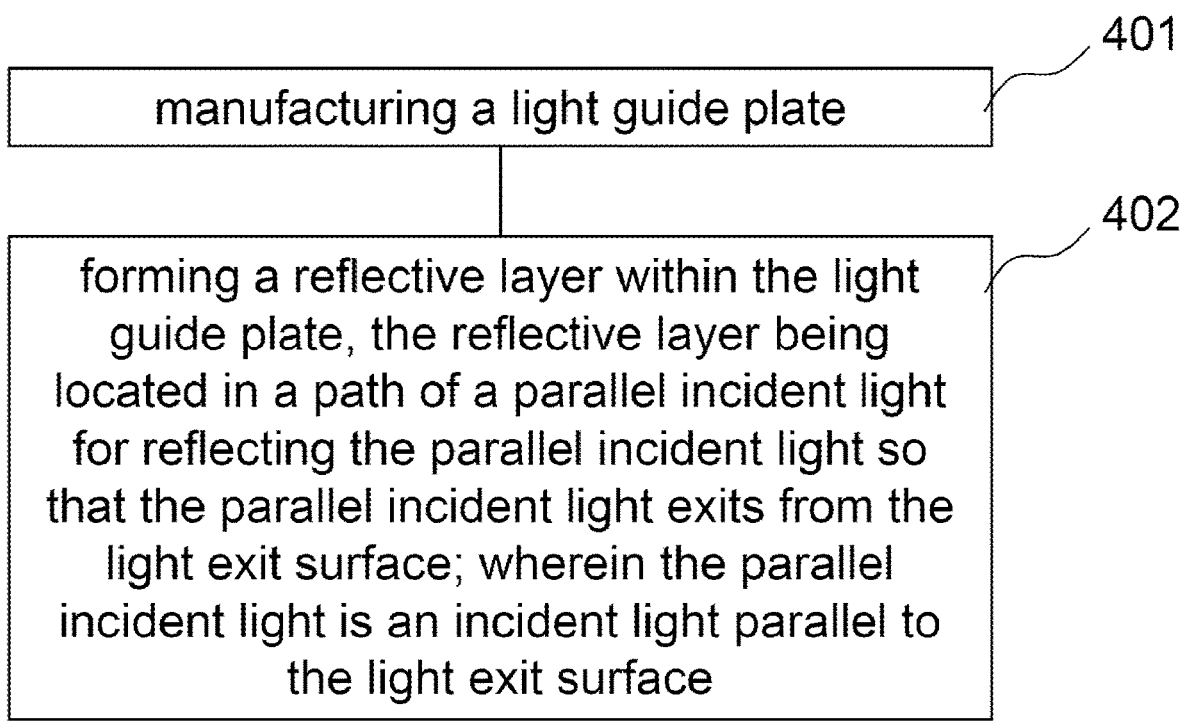
FIG. 4 is a flow chart of a manufacturing method of a light guide plate according to a fifth embodiment of the present disclosure.

A fifth embodiment of the present disclosure provides a method for manufacturing a light guide plate. Referring to FIG. 4, the method includes the following steps.

In step 401, a light guide plate is manufactured.

The light guide plate includes a light entrance surface, a light exit surface connected with the light entrance surface, and a bottom surface connected with the light entrance surface and opposite to the light exit surface.

In step 402, a reflective layer is formed within the light guide plate in the path of the parallel incident light for reflecting the parallel incident light so that the parallel incident light exits from the light exit surface. The parallel incident light is an incident light parallel to the light exit surface.

In this embodiment, a light guide plate is manufactured, and a reflective layer is provided within the light guide plate in the path of the parallel incident light. Without the reflective layer, the parallel incident light propagates linearly within the light guide plate and exits from the opposite surface of the light entrance surface. The reflective layer changes the original linear path of the reflective layer and makes the parallel incident light continue to propagate in other directions within the light guide plate. The parallel incident light is finally scattered by the dots on the bottom surface and then exits from the light exit surface, and the parallel incident light lost in the prior art is reused, so that the brightness of the backlight module with the above light guide plate is significantly increased, and the display device provided with the above light guide plate has a better display effect.

Embodiment 6

Figure 5:
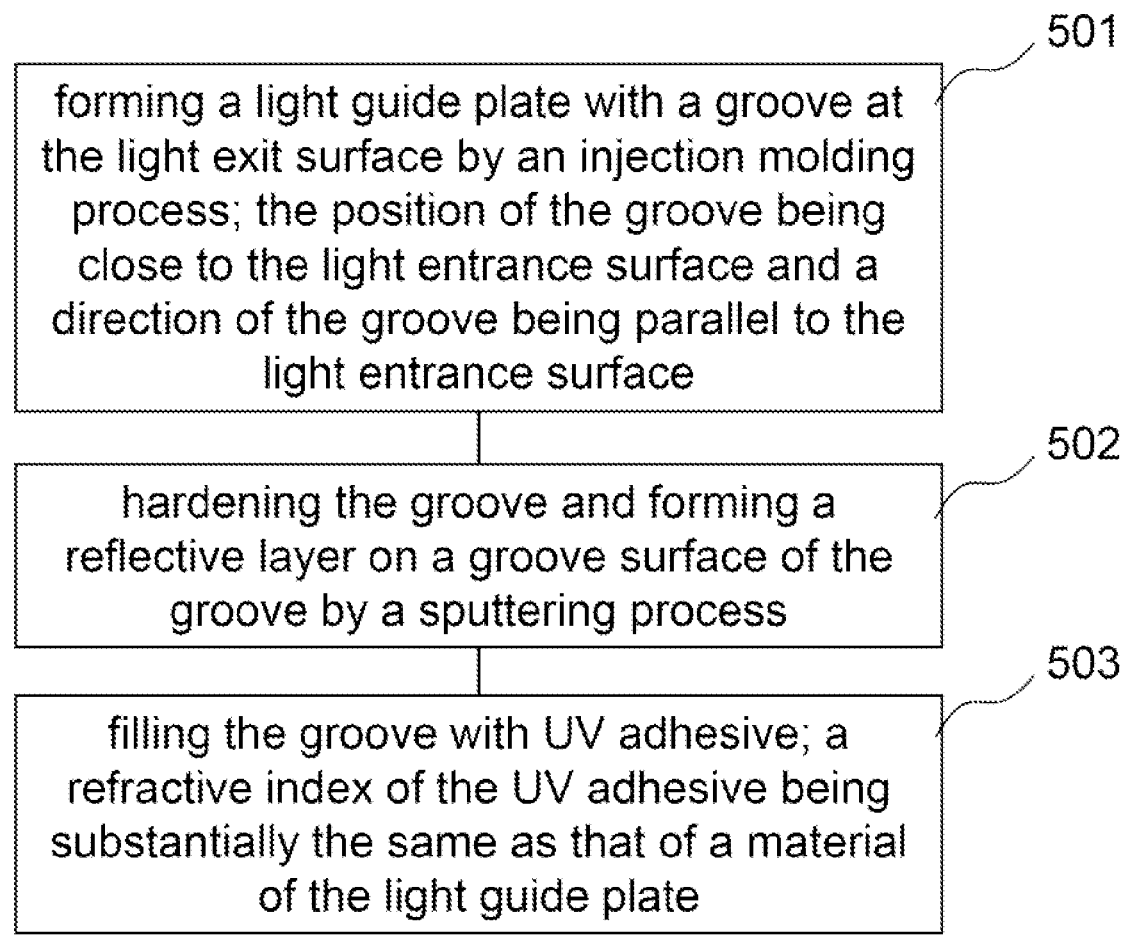
FIG. 5 is a flow chart of a manufacturing method of a light guide plate according to a sixth embodiment of the present disclosure.

As a specific embodiment, referring to FIG. 5, the step 401 of manufacturing the light guide plate includes the following steps.

In step 501, a light guide plate with a groove at the light exit surface is formed by an injection molding process. The position of the groove is close to the light entrance surface, and a direction of the groove is parallel to the light entrance surface.

In this step, a material of the light guide plate may be polymethyl methacrylate.

In step 502, hardening treatment is performed for the groove, and the reflective layer is formed on the groove surface of the groove by a sputtering process.

In certain exemplary embodiments, a material of the reflective layer is silver, aluminum, zinc sulfide or a combination of any two thereof.

In this step, the groove on the light guide plate is hardened first, because the surface of the light guide plate that is not hardened is difficult to perform the subsequent sputtering process. According to the test data, after the polycarbonate (PC) is hardened, the hardness changes from 4B to HB; after the polymethyl methacrylate (PMMA) is hardened, the hardness changes from H to 3H. Therefore, in this embodiment, the light guide plate of polymethyl methacrylate is selected to facilitate subsequent sputtering.

In step 503, the groove is filled with UV adhesive. A refractive index of the UV adhesive is substantially the same as that of the material of the light guide plate.

In this step, the groove is filled up with UV adhesive to ensure the structural strength of the light guide plate. Furthermore, the refractive index of the selected UV adhesive is substantially the same as that of the material of the light guide plate, so as to ensure the uniform propagation of light in the light guide plate.

In this embodiment, a method for manufacturing a light guide plate is provided. The method includes forming a light guide plate with a specific groove and forming a reflective layer on the surface of the groove by a sputtering process. Based on the groove arrangement, the reflective layer is in the path of the parallel incident light. The reflective layer can reflect the parallel incident light to the light exit surface or the bottom surface of the light guide plate, so that the parallel incident light exits directly from the light exit surface; or, the parallel incident light reaches the bottom surface after being reflected once, the reflected light is then scattered by the dots at the bottom surface, and finally exits from the light exit surface. Thus, the utilization rate of the parallel incident light is further improved, and the light intensity loss of the parallel incident light propagating in the light guide plate is effectively reduced.

It should be noted that in the embodiments of the present disclosure, the parallel incident light is not limited to its literal meaning, and the parallel incident light may include not only the incident light entering the light guide plate parallel to the light exit surface but also the incident light emitted from the central position of the light emitting surface of the LED light source and approximately parallel to the light exit surface. Due to the small incident angle, this part of the incident light can still exit from the surface opposite to the light entrance surface of the light guide plate at a relatively small exit angle after entering the light guide plate, which also causes loss. In the embodiment of the present disclosure, the reflective layer can also change the propagation path of this part of incident light, so that it can continue to propagate within the light guide plate and finally exit from the light exit surface.

With the above embodiments, the brightness of the backlight module is significantly improved. In one example, the brightness of the backlight module is about 5600 nits. Under the same conditions, the brightness of the backlight module of the prior art is about 4300 nits. It can be seen that the brightness of the backlight module provided by the embodiments of the present disclosure is improved by about 30% compared with the backlight module of the prior art.

Apparently, the person skilled in the art may make various alterations and variations to the exemplary embodiments of the disclosure without departing the spirit and scope of the disclosure. As such, provided that these modifications and variations of the disclosure pertain to the scope of the claims and their equivalents, the exemplary embodiments of the disclosure are intended to embrace these alterations and variations.

What is claimed is:

1. A light guide plate, comprising: a light entrance surface, a light exit surface connected with the light entrance surface, and a bottom surface connected with the light entrance surface and opposite to the light exit surface; wherein a reflective layer is provided within the light guide plate, and the reflective layer is located in a path of a parallel incident light for reflecting the parallel incident light so that the parallel incident light exits from the light exit surface; wherein the parallel incident light is an incident light parallel to the light exit surface;

and wherein the light exit surface is provided with a groove; a direction of the groove is parallel to the light entrance surface, and the reflective layer is disposed on a groove surface of the groove.

2. The light guide plate according to claim 1, wherein the groove is filled with UV adhesive; a refractive index of the UV adhesive is substantially the same as that of a material of the light guide plate.

3. The light guide plate according to claim 1, wherein a material of the reflective layer comprises silver, aluminum, zinc sulfide, or a combination of any two thereof.

4. A backlight module, comprising the light guide plate according to claim 1.

5. A display device, comprising the backlight module according to claim 4.

6. The backlight module according to claim 4, wherein the groove is filled with UV adhesive; a refractive index of the UV adhesive is substantially the same as that of a material of the light guide plate.

7. The backlight module according to claim 4, wherein a material of the reflective layer comprises silver, aluminum, zinc sulfide, or a combination of any two thereof.

8. A method for manufacturing a light guide plate, comprising: manufacturing a light guide plate, the light guide plate comprising a light entrance surface, a light exit surface connected with the light entrance surface, and a bottom surface connected with the light entrance surface and opposite to the light exit surface; forming a reflective layer within the light guide plate, the reflective layer being located in a path of a parallel incident light for reflecting the parallel incident light so that the parallel incident light exits from the light exit surface; wherein the parallel incident light is an incident light parallel to the light exit surface;

wherein the step of manufacturing the light guide plate comprises:

forming a light guide plate with a groove at the light exit surface by an injection molding process; the position of the groove being close to the light entrance surface and a direction of the groove being parallel to the light entrance surface;

hardening the groove and forming a reflective layer on a groove surface of the groove by a sputtering process.

9. The method for manufacturing a light guide plate according to claim 8, wherein a material of the reflective layer is silver, aluminum, zinc sulfide, or a combination of any two thereof.

10. The method for manufacturing a light guide plate according to claim 8, wherein the step of manufacturing the light guide plate further comprises: filling the groove with UV adhesive; a refractive index of the UV adhesive being substantially the same as that of a material of the light guide plate.

11. The method for manufacturing a light guide plate according to claim 8, wherein a material of the light guide plate is polymethyl methacrylate.

12. The method for manufacturing a light guide plate according to claim 8, wherein a material of the reflective layer is silver, aluminum, zinc sulfide, or a combination of any two thereof.

13. The method for manufacturing a light guide plate according to claim 8, wherein a material of the light guide plate is polymethyl methacrylate.

* * * * *